Jan. 6, 1942.　　　　M. LONDON　　　　2,269,117
TICKET COLLECTING APPARATUS
Filed Aug. 11, 1939

INVENTOR.
Milton London
BY Daniel Cullen
ATTORNEY.

Patented Jan. 6, 1942

2,269,117

UNITED STATES PATENT OFFICE 2,269,117

TICKET COLLECTING APPARATUS

Milton London, Detroit, Mich.

Application August 11, 1939, Serial No. 289,611

1 Claim. (Cl. 235—92)

This application relates to ticket collecting apparatus and aims to provide a novel and simple apparatus for the handling of admission tickets.

For an understanding of the apparatus herein disclosed, and its use, reference should be had to the appended drawing and description. In the drawing, Fig. 1 is a diagrammatic view of a ticket collecting apparatus employing photoelectric counting means;

Figure 2:
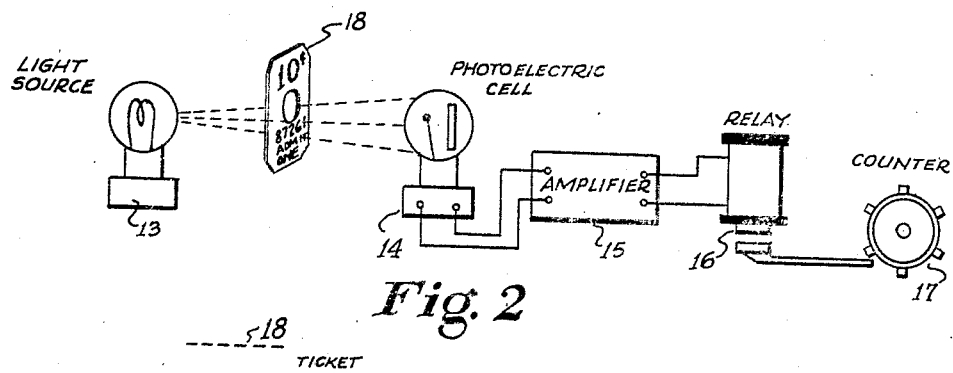
Fig. 2 is a diagrammatic view of the ticket counting means.
Figure 1:
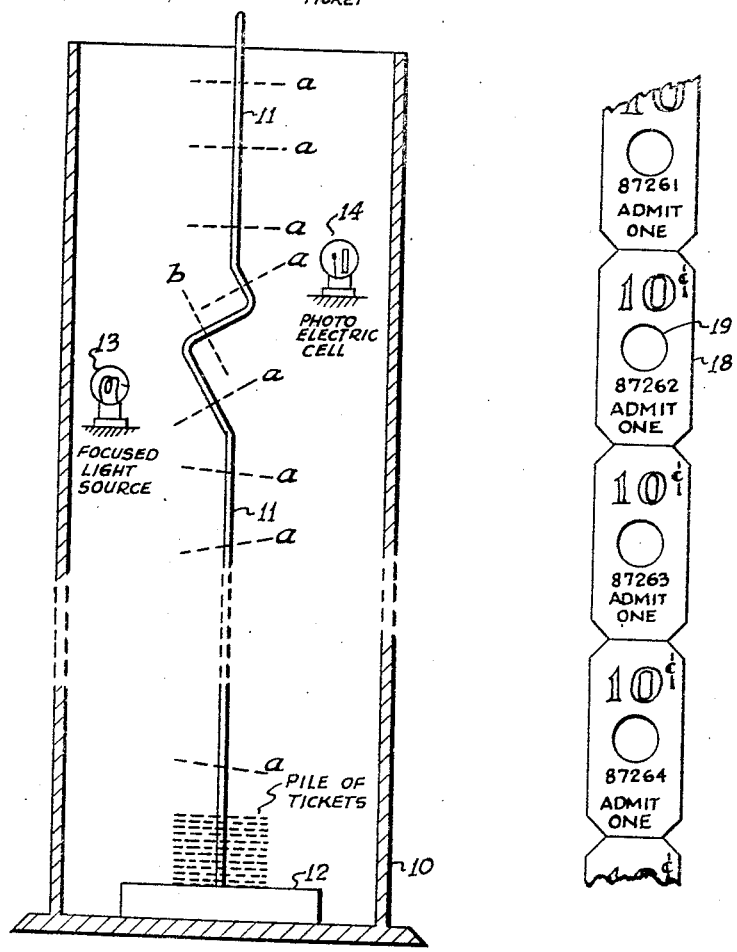

The apparatus herein disclosed comprises a vertically arranged hollow box 10 having an open top and an openable side and containing a vertically arranged elongated spindle 11 fixed to a base 12 and removable with its base from the box 10 through the openable side of the box.

Within the box is disposed and suitably mounted a counting means employing a focused light source 13 and a photoelectric cell 14, the latter being connected through any suitable amplifier 15 to a relay 16 for operating a suitable counter 17. Part or all of the counting means may be within the box 10 as desired. The counting means herein illustrated is intended to represent a conventional photoelectric cell counting means which will register on the counter the number of interruptions of the beam of light from the light source 13 to the photoelectric cell 14 and is intended to be only a diagrammatic representation.

Figure 3:
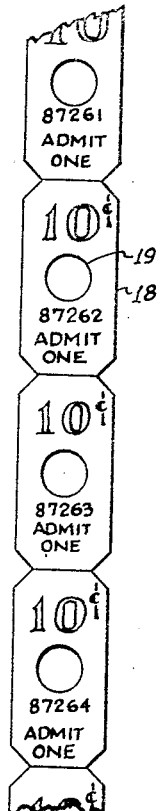
Fig. 3 illustrates a strip of tickets for use with the apparatus herein disclosed.

The tickets to be employed consist of paper or cardboard tickets 18, as shown in Fig. 3, each having a central perforation 19, with the entire strip of tickets being numbered in consecutive serial numbers.

The use of the apparatus is as follows: The ticket taker receives tickets from incoming patrons and without mutilating the tickets places them, one by one, on the spindle by threading their perforations 19 over the upper or free end of the spindle. The tickets slide down the spindle and as they cross the beam of light from the light source they interrupt that beam to affect the photoelectric cell, whereupon the relay will operate the counter to record the fact that a ticket has passed the beam of light on its way from the ticket taker to the pile of tickets at the bottom of the spindle. The counter will thus register the number of tickets that are received by the ticket taker and deposited by him on the spindle.

The tickets that are collected are at no time mutilated but slide along the spindle to the base 12 where they remain, forming a pile whose sequence corresponds to the order in which they are received by the ticket taker and deposited by him.

The person who is charged with the duty of checking the admissions (the checker) can quickly remove a spindle 11 with its base 12 and the pile of tickets thereon from the box 10 and replace it by a fresh spindle for a fresh supply of tickets, and at the same time view the counter 17. He can then examine the supply of tickets that remain on the base 12 around the spindle 11. By checking their serial numbers against the count of the counter 17 and by checking the serial numbers for sequence he can determine whether or not the ticket taker is depositing in the apparatus all of the tickets that are received by him, it being assumed, as is generally the case, that the ticket vendor will sell tickets of consecutive serial numbers and that the patrons will follow that sequence as they proceed to the ticket taker. Any appreciable gaps in the consecutive numbering of the tickets found on the spindle 11 will require an explanation from the ticket taker and this will afford a means for checking his integrity.

It will be understood that before and after each run of tickets is received, as for example, when the ticket taker assumes his station and when he leaves his station, the then readings of the counter will be taken. By subtracting the lower reading from the higher reading, the checker can determine how many tickets were counted. Similarly, before and after each run of tickets is sold, as for example, when the ticket seller assumes his station and when he leaves it, the then readings of the serial number of the leading ticket of his supply of tickets is taken, and by subtracting the lower number (the reading at the start of the run) from the higher number (the reading at the end of the run), the checker can determine how many tickets were sold. By comparing the number sold, with the number counted, the checker can determine how many of the tickets sold were deposited on the spindle and how many of the tickets sold were not deposited on the spindle. The number of tickets sold and not deposited on the spindle, if large, will justify an accusation against the ticket taker that he received tickets but did not deposit them, and will call for an explanation. He will not be able to explain away the deficiency by asserting that patrons bought tickets but did not use them, and therefore did not surrender them, for experience shows that number to be very small. He will not be able to blame the ticket receiving apparatus for the deficiency, for that apparatus can easily be checked by comparing the counter readings with the actual number of tickets filed on the spindle, and if they correspond, the apparatus works properly. If this be the case, there will be only one explanation, and that will be that the ticket taker either permitted patrons to enter without obtaining their tickets or that he obtained their tickets but failed to deposit them. In either event, he is derelict and the deficiency, subject to an allowance for the possibility that some proportion of patrons buy tickets but do not present them to the ticket taker for admission, can properly be charged against him.

Similarly, by examining the tickets that are accumulated and gathered on the base 12 around the spindle 11, the checker can determine whether or not there have been received by the ticket taker any tickets other than those authorized to be sold and received and this is of importance for quite often ticket vendors sell to patrons tickets that are not authorized to be sold and will pocket the receipts from the sale of such tickets and the ticket taker, on the other hand, will have no way of determining quickly whether or not the tickets that he receives are those authorized to be sold.

If, as is now the practice, the tickets received by the ticket taker are mutilated, there is no way for the checker to determine that the tickets received by the ticket taker are those authorized to be sold, nor can he check serial numbers. The apparatus hereof provides a means for checking the tickets to see that they are the ones authorized to be sold and to check their serial numbers because the tickets are checked without their being mutilated and at the same time it is impossible for the ticket taker to retain in his hand or pocket tickets handed him by patrons without that fact being recorded by the apparatus hereof, in gaps of serial number sequence.

It will be understood that the checker, knowing the printing, color, size, etc., of tickets authorized to be sold, can easily, by comparing the tickets of the pile on the spindle with tickets known to be genuine, determine whether or not the tickets received by the ticket taker from patrons, who in turn can be presumed to have received them from the ticket seller, are genuine authorized tickets or are counterfeits. Any discrepancy caused by the presence of counterfeit tickets can be charged to the ticket seller who can hardly blame the presence of such tickets on anyone but himself. To blame patrons would not be proper, for except in negligibly few cases, as experience has shown, patrons present no other tickets than the tickets they receive from the ticket seller.

The counting means provides a check for the number of tickets sold and the accumulated count of the counter device may be checked against the highest and lowest serial numbers of the tickets received during any interval covered by the counter and may also be checked against the receipts of the ticket vendor to provide a still further way of checking the entire ticket vending and ticket collecting procedure.

The apparatus herein disclosed is particularly useful in connection with moving picture theatres for it will provide an accurate and complete check of all phases of ticket selling and ticket taking that now take place without affecting in any way the present habits of the customer. The apparatus hereof counts tickets received and does not count persons as they enter the theatre. The apparatus hereof makes it impossible for the ticket vendor to sell unauthorized tickets without that fact being detected because experience has shown that negligibly few tickets that are sold are not used, and thus detection of the fact that unauthorized tickets are being sold, if they are being sold in any substantial amount, will be assured. It makes it impossible for the ticket taker to pocket tickets that have been sold without that fact being detected. The apparatus hereof may be manipulated for ticket collection as quickly as are the ticket taking means employed at the present time without requiring the addition of employees and without in any way disturbing customer habit or slowing up the entrance of patrons.

A feature of the apparatus herein disclosed is the provision of zig zags or bends in the spindle down which the tickets slide. If the spindle were perfectly straight and vertical it is entirely possible that the tickets might slide down the spindle too rapidly and some of them would not cause interruptions of the beam of light to the cell. By providing the zig zag arrangement the descent of the tickets is slowed up to a considerable extent. Further, by arranging the light source, the cell, and the zig zag portions of the spindle relatively, there may be provided a path of movement for a ticket which is certain to cause an interruption of the beam to the cells. As illustrated, tickets at stations $a$ will cause no interruption whereas a ticket at station $b$ will not only cause an interruption but the interruption will be a prolonged one inasmuch as the light source and the cell are arranged so that the beam is coaxial with the non-vertical portion of the spindle, station $b$.

Now having described the ticket taking apparatus herein disclosed, reference should be had to the claim which follows for a determination of the invention.

I claim:

Apparatus for receiving perforated paper tickets, without substantially mutilating them, in the order to which they are delivered to the apparatus, comprising a long vertically disposed spindle having a free upper end and along which perforated tickets may slide downwardly to pile up at the lower end of the spindle, and means for counting the tickets as they slide down the spindle, including a photoelectric cell arranged to be affected by the sliding of the tickets along the spindle, the spindle being vertically arranged but having portions arranged out of vertical to slow up the descent of the tickets, the cell being so related to these portions that only while a ticket is sliding along these portions will it affect the cell.

MILTON LONDON.